United States Patent
Chukalina et al.

(10) Patent No.: US 12,014,449 B2
(45) Date of Patent: Jun. 18, 2024

(54) COMPUTED TOMOGRAPHY (CT) IMAGE RECONSTRUCTION FROM POLYCHROMATIC PROJECTION DATA

(71) Applicant: Smart Engines Service, LLC, Moscow (RU)

(72) Inventors: Marina Valerievna Chukalina, Moscow (RU); Anastasia Sergeevna Ingacheva, Moscow (RU); Dmitry Petrovich Nikolaev, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 281 days.

(21) Appl. No.: 17/495,617

(22) Filed: Oct. 6, 2021

(65) Prior Publication Data

US 2022/0292736 A1    Sep. 15, 2022

(30) Foreign Application Priority Data

Mar. 15, 2021  (RU) ............................... 2021106628

(51) Int. Cl.
  *G06N 3/08*  (2023.01)
  *G06T 11/00*  (2006.01)

(52) U.S. Cl.
  CPC ........ *G06T 11/005* (2013.01); *G06T 2210/41* (2013.01)

(58) Field of Classification Search
  CPC .......... G06N 3/08; G06N 3/0454; G06N 3/06; G06T 11/006; G06T 11/005; C11D 17/06; C11D 3/505
  See application file for complete search history.

(56) References Cited

U.S. PATENT DOCUMENTS

2010/0128844 A1*  5/2010  Thomsen .................. G06T 7/11
                                                                    378/53

OTHER PUBLICATIONS

Brooks et al., "Beam Hardening in X-ray Reconstructive Tomography," Phys. Med. Biol., 1976, vol. 21, No. 3, pp. 390-398.
De Man et al., "An Iterative Maximum-Likelihood Polychromatic Algorithm for CT," IEEE Transactions on Medical Imaging, vol. 20, No. 10, Oct. 2001, pp. 999-1008.
Elbakri et al., "Segmentation-Free Statistical Image Reconstruction for Polyenergetic X-Ray Computed Tomography," Electrical Engineering and Computer Science Department, IEEE 2002, pp. 828-831.
Feldkamp et al., "Practical cone-beam algorithm," J. Opt. Soc. Am. A/vol. 1, No. 6/ Jun. 1984, pp. 612-619.
Gabor T. Herman, Ph.D., "Correction for Beam Hardening in Computed Tomography," Phys. Med. Biol., 1979, vol. 24, No. 1, pp. 81-106.

(Continued)

*Primary Examiner* — Phuoc H Doan
(74) *Attorney, Agent, or Firm* — Procopio, Cory Hargreaves & Savitch LLP

(57) ABSTRACT

Computed tomography (CT) image reconstruction from polychromatic projection data. In an embodiment, polychromatic projection data is acquired using a CT system. An optimal correction value for linearization of the polychromatic projection data is determined, and the polychromatic projection data is linearized according to the determined optimal correction value. The image is then reconstructed from the linearized projection data.

10 Claims, 16 Drawing Sheets

(56) References Cited

OTHER PUBLICATIONS

Robert J. Jennings, "A method for comparing beam-hardening filter materials for diagnostic radiology," Med. Phys. 15 (4), Jul./Aug. 1988, pp. 588-599.
Kyriakou et al., "Empirical beam hardening correction (EBHC) for CT," Med. Phys. 37 (10), Oct. 2010, pp. 5179-5187.
Edwin C. McCullough, "Photon attenuation in computed tomography," Medical Physics, vol. 2, No. 6, Nov./Dec. 1975, pp. 307-320.
Menvielle et al., "Reduction of Beam-Hardening Artifacts in X-Ray CT," Proceedings of the 2005 IEEE, Engineering in Medicine and Biology 27th Annual Conference, Shanghai, China, Sep. 1-4, 2005, pp. 1865-1868.
Nikolaev et al., "CT Image Quality Assessment based on Morphometric Analysis of Artifacts," Proc. of SPIE vol. 10253, 2016, 5 pages.
Park et al., "Metal Artifact Reduction for Polychromatic X-ray CT Based on a Beam-Hardening Corrector," IEEE Transactions on Medical Imaging, vol. 35, No. 2, Feb. 2016, pp. 480-487.
Yu et al., "Dual-Energy CT-Based Monochromatic Imaging," AJR:199, Nov. 2012, S9-S15.
Renata Wilk, "Application of Computed Tomography and Magnetic Resonance in 3D Modeling," Stem Cells and Biomaterials for Regenerative Medicine, https://doi.org/10.1016/B978-0-12-812258-7.00009-5, 2019, CT and MRI in 3D Modeling, Chapter 9, pp. 121-142.
Nasim et al., "Application of Cone Beam Computed Tomography Gray Scale Values in the Diagnosis of Cysts and Tumors," Journal of Indian Academy of Oral Medicine & Radiology, vol. 30, Issue 1, Jan.-Mar. 2018, pp. 4-9.
Nicholas Drage, "Cone beam computed tomography (CBCT) in general dental practice," Prim Dent J. 2018;7(1):26-30.
Bornstein et al., "Use of cone beam computed tomography in implant dentistry: current concepts, indications and imitations for clinical practice and research," Periodontology 2000, vol. 73, 2017, 51-72.
De Chiffre et al., "Industrial applications of computed tomography," CIRP Annals—Manufacturing Technology 63 (2014) 655-677.
Thompson et al., "X-ray computed tomography for additive manufacturing: a review," Meas. Sci. Technol. 27 (2016) 072001 (17pp).
Gratton et al., "Application of Computed Tomography for the Examination of Pressure Retaining Nuclear Plant Components," Proceedings of the ASME 2017 Pressure Vessels and Piping Conference, PVP 2017, Jul. 16-20, PVP2017-65051, pp. 1-6.
Kak et al., "Principles of Computerized Tomographic Imaging," IEEE Press, The Institute of Electrical and Electronics Engineers, Inc., New York, 1999, pp. 1-329.
Huang et al., "An evaluation of three commercially available metal artifact reduction methods for CT imaging," Phys. Med. Biol. 60 (2015) 1047-1067.
Dodge et al., "Performance evaluation of iterative reconstruction algorithms for achieving CT radiation dose reduction—a phantom study," Journal of Applied Clinical Medical Physics, vol. 17, No. 2, 2016, pp. 511-531.
Kasai et al., "Tomographic Image Reconstruction Based on Minimization of Symmetrized Kullback-Leibler Divergence," Hindawi, Mathematical Problems in Engineering, Article ID 8973131, Jul. 17, 2018, 9 pages.
Tateishi et al., "Continuous Analog of Accelerated OS-EM Algorithm for Computed Tomography," Hindawi, Mathematical Problems in Engineering, Article ID 1564123, Aug. 6, 2017, 8 pages.
Kojima et al., "Multivalued Discrete Tomography Using Dynamical System That Describes Competition," Hindawi, Mathematical Problems in Engineering, Article ID 8160354, Nov. 12, 2017, 9 pages.
Stonestrom et al., "A Framework for Spectral Artifact Corrections in X-Ray CT," IEEE Transactions on Biomedical Engineering, vol. BME-28, No. 2, Feb. 1981, pp. 128-141.
Chen et al., "A filter design method for beam hardening correction in middle-energy X-ray Computed Tomography," Proc. of SPIE vol. 10033 1003352-1 2016, 6 pages.
Van Geet et al., "Quantitative analysis of reservoir rocks by microfocus X-ray computerised tomography," Sedimentary Geology 132 (2000) 25-36.
Brabant et al., "A novel beam hardening correction method requiring No. prior knowledge, incorporated in an iterative reconstruction algorithm," NDT&E International 51 (2012) 68-73.
Jin et al., "A Model-Based Image Reconstruction Algorithm With Simultaneous Beam Hardening Correction for X-Ray CT," IEEE Transactions on Computational Imaging, vol. 1, No. 3, Sep. 2015, pp. 200-216.
Hsieh et al., "An iterative approach to the beam hardening correction in cone beam CT," Med. Phys. 27 (1), Jan. 2000, pp. 23-29.
Xie et al., "Blind deconvolution combined with level set method for correcting cupping artifacts in cone beam CT," Medical Imaging 2017: Proc. of SPIE, vol. 10133, 101331Z, 5 pages.
Sarkar et al., "An empirical correction method for beam-hardening artifact in Computerized Tomography (CT) images," NDT and E International 102 (2019) 104-113.
Chukalina et al., "Automatic Beam Hardening Correction for CT Reconstruction," Proceedings 31st European Conference on Modelling and Simulation, May 2017, 6 pages.
Buzmakov et al., "Monochromatic computed microtomography using laboratory and synchrotron sources and X-ray fluorescence analysis for comprehensive analysis of structural changes in bones," J. Appl. Cryst. (2015). 48, 693-701.
Klaus Mueller, Dipl. Ing. (Fh), M.S., M.S., "Fast and Accurate Three-Dimensional Reconstruction From Cone-Beam Projection Data Using Algebraic Methods," Dissertation, The Ohio State University 1998, 132 pages.
Van Aarle et al., "Fast and flexible X-ray tomography using the ASTRA toolbox," 2016 Optical Society of America, 19 pages.
Punnoose et al., "Technical Note: spektr 3.0—A computational tool for x-ray spectrum modeling and analysis," Med. Phys. 43 (8), Aug. 2016, pp. 4711-4717.
Gongadze et al., "Alignment and resolution studies of a MARS scanner," Article in Physics of Particles and Nuclei Letters, Jan. 2015, 27 pages.
Kozhevnikov et al., "Equalization of Medipix family detector energy thresholds using X-ray tube spectrum high energy cut-off," Jinst Technical Report 2019, 12 pages.
Vasconcelos et al., "Artefact expression associated with several cone-beam computed tomographic machines when imaging root filled teeth," International Endodontic Journal, 48, 994-1000, 2015.
Ingacheva et al., "Polychromatic CT Data Improvement with One-Parameter Power Correction," Hindawi, Mathematical Problems in Engineering, vol. 2019, Article ID 1405365, 12 pages.

\* cited by examiner

FIG. 3A
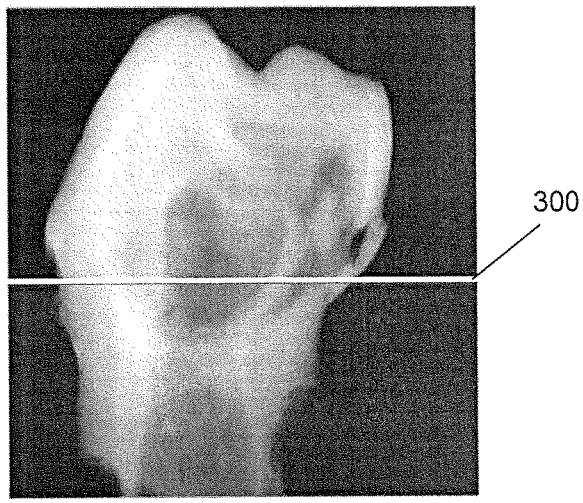
FIG. 3B
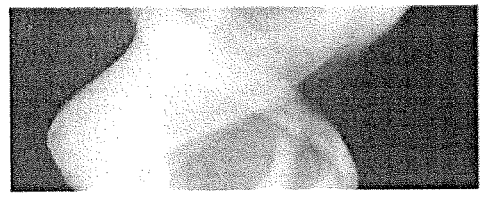
300
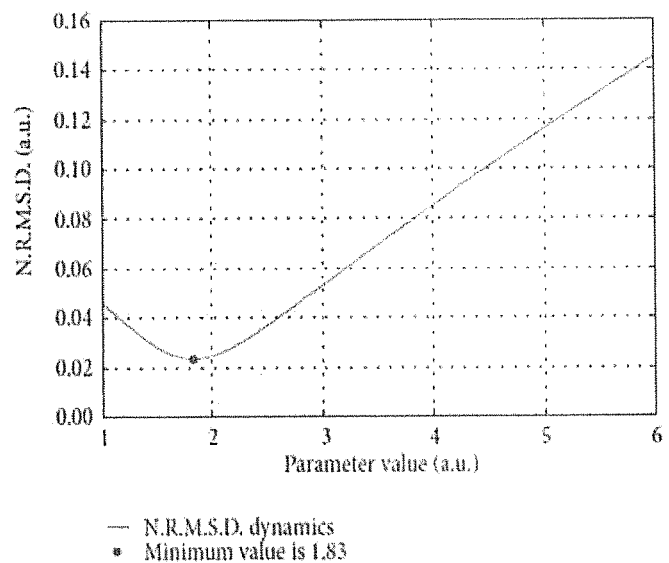
FIG. 4

FIG. 7
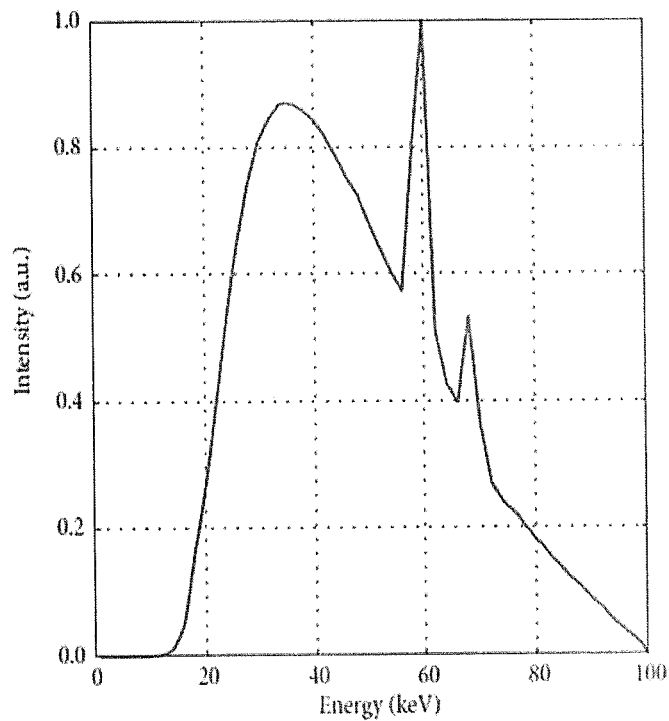
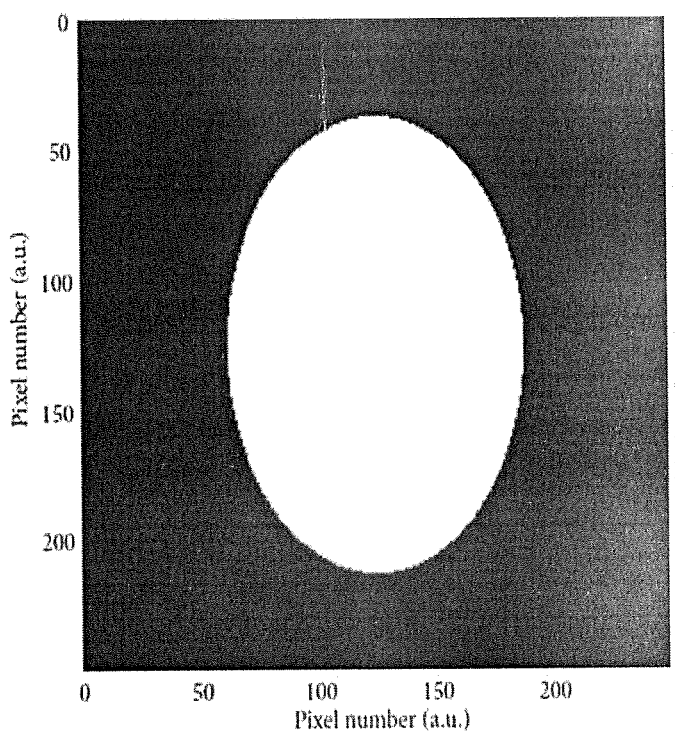
FIG. 8

— N.R.M.S.D. dynamics
• Minimum value is 1.29

FIG. 11A
FIG. 11B
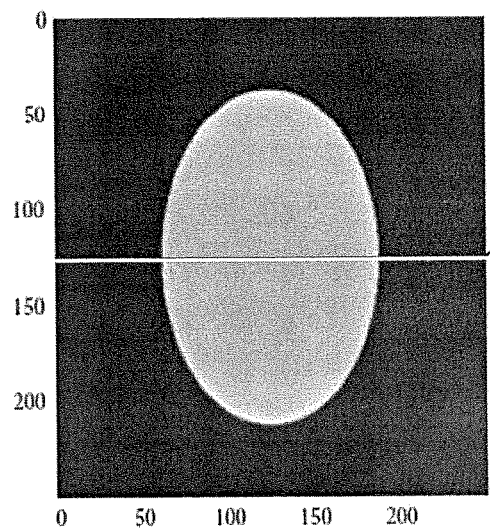
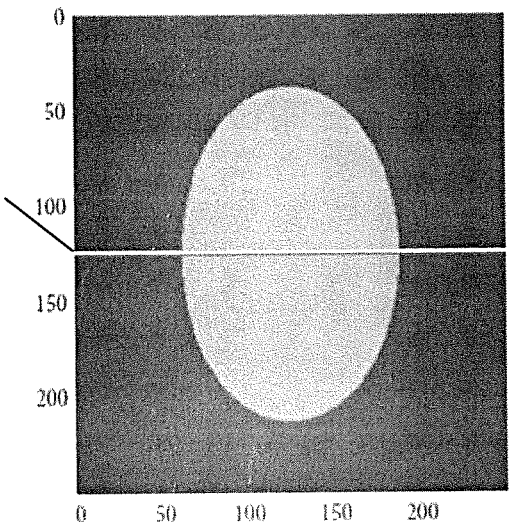
row 125
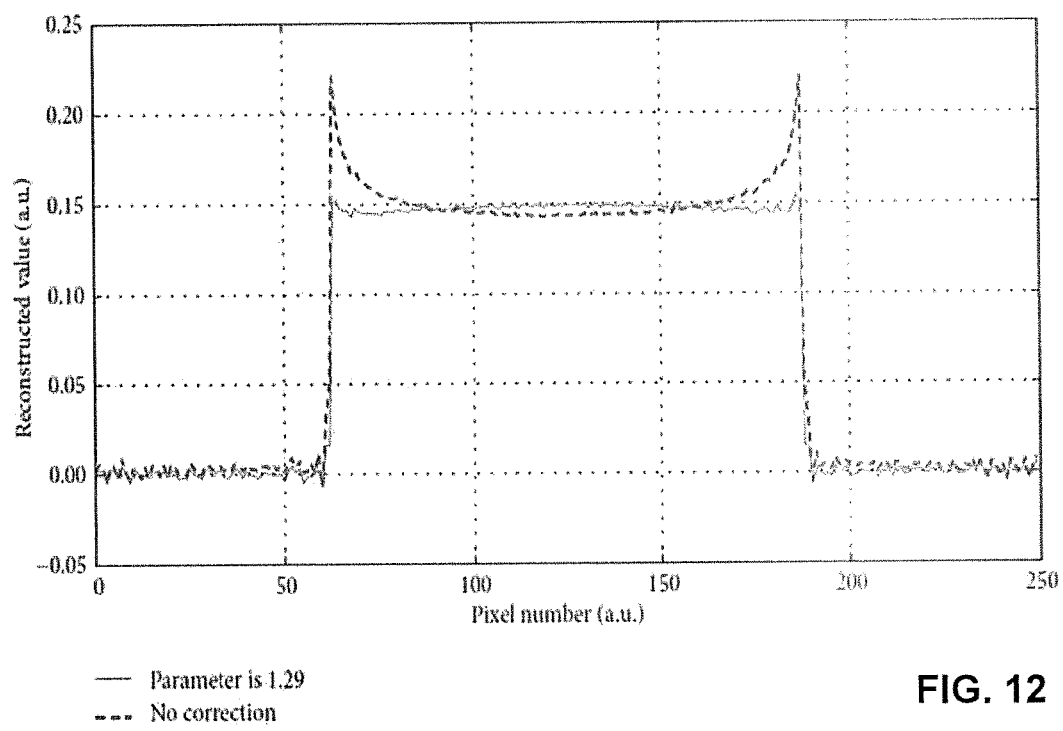
— Parameter is 1.29
--- No correction
FIG. 12

FIG. 13A
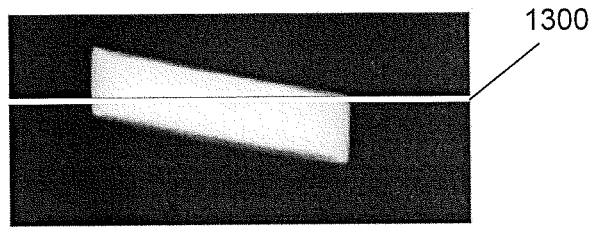
FIG. 13B
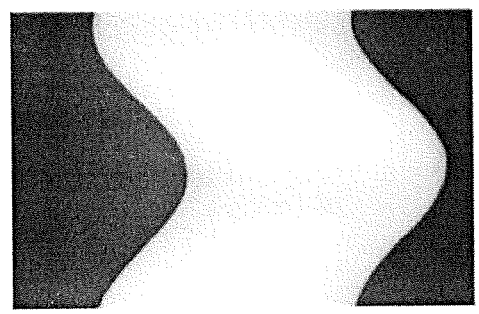
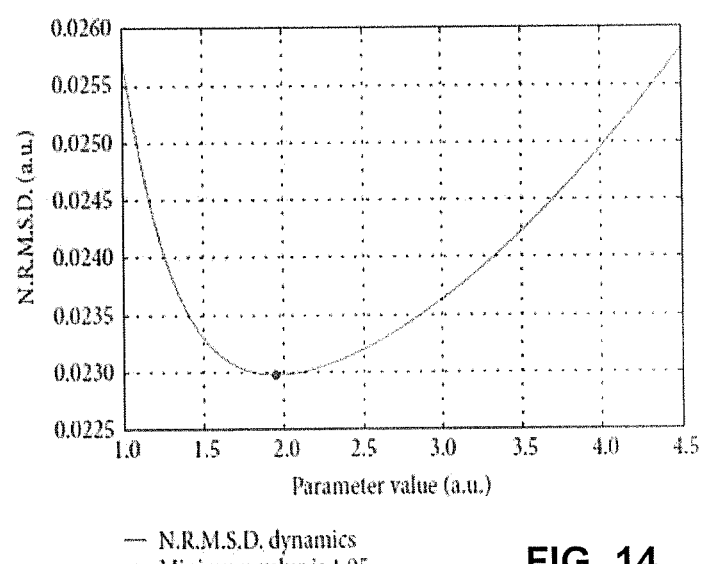
— N.R.M.S.D. dynamics
• Minimum value is 1.95
FIG. 14

FIG. 17
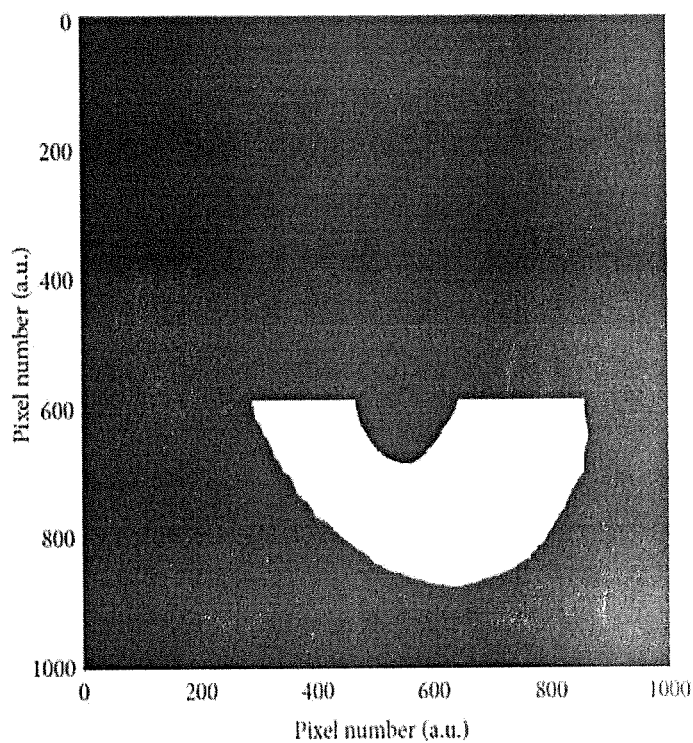
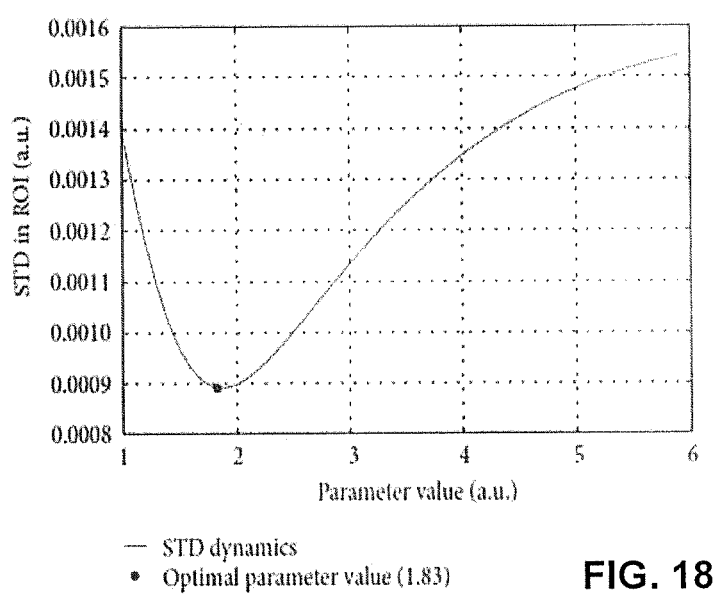
— STD dynamics
• Optimal parameter value (1.83)
FIG. 18

FIG. 20
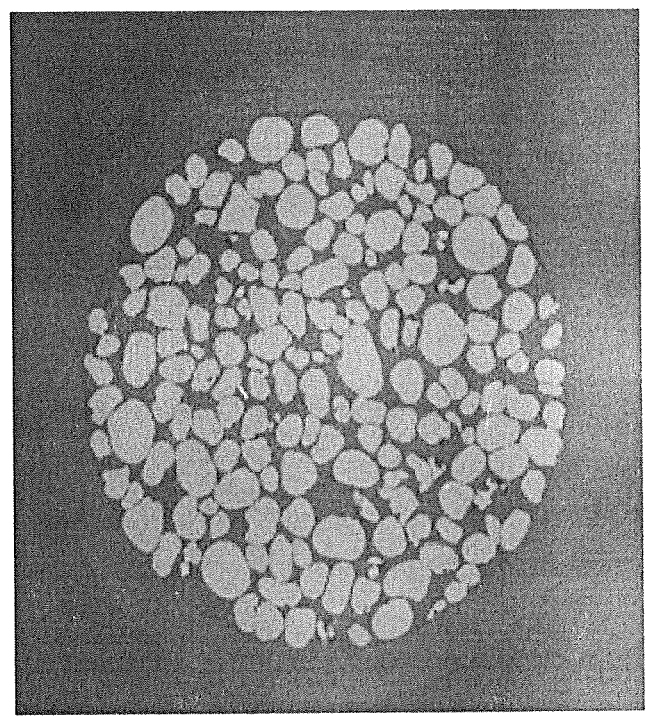
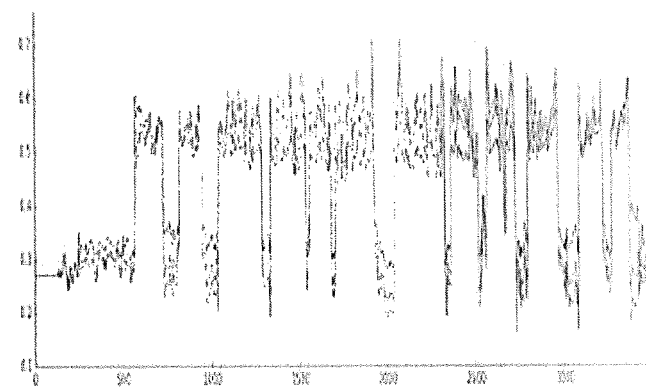
FIG. 21

FIG. 24A
FIG. 24B
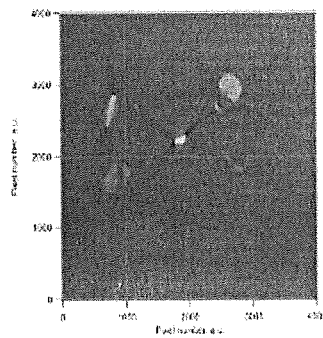
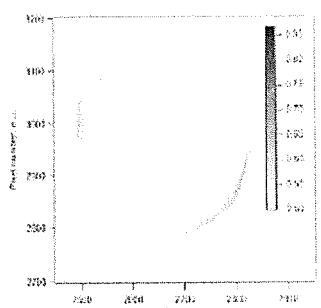
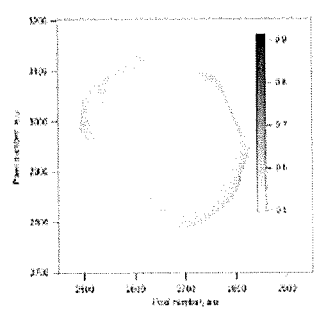
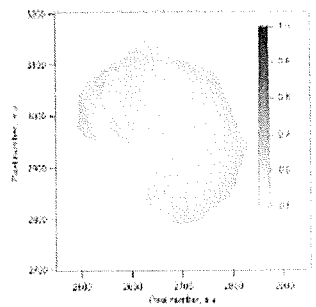
FIG. 24C
FIG. 24D
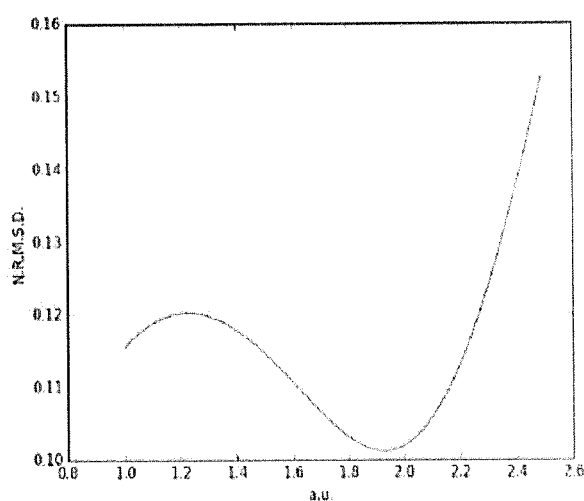
FIG. 25

FIG. 26
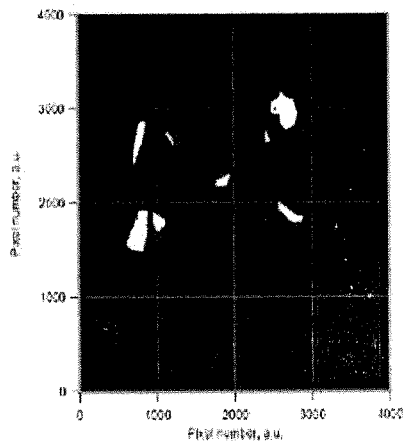
FIG. 27
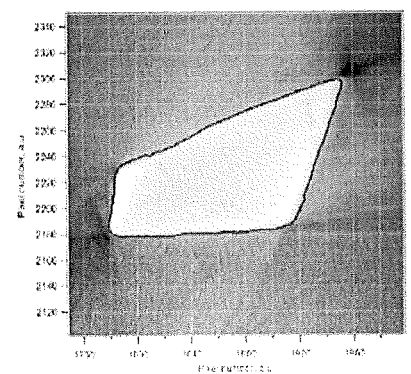
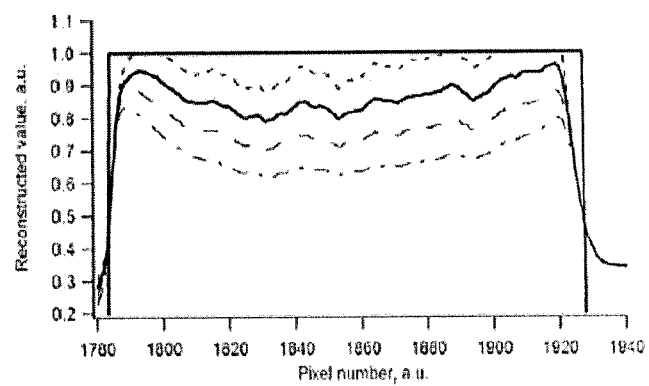
FIG. 28

COMPUTED TOMOGRAPHY (CT) IMAGE RECONSTRUCTION FROM POLYCHROMATIC PROJECTION DATA

CROSS-REFERENCE TO RELATED APPLICATIONS

This application claims priority to Russian Patent App. No. 2021106628, filed on Mar. 15, 2021, which is hereby incorporated herein by reference as if set forth in full.

BACKGROUND

Field of the Invention

The embodiments described herein are generally directed to image reconstruction in computed tomography (CT), and, more particularly, to reducing artifacts during image reconstruction from polychromatic projection data.

Description of the Related Art

X-ray computed tomography is a non-destructive technique for studying and visualizing interior features of an object without its physical destruction. Currently, computed tomography is one of the main noninvasive diagnostic methods used in medical, scientific, and industrial applications. For example, in medicine, computed tomography is used for three-dimensional visualization of the inner structure of patient's organs for the study of disease and course control. In dentistry, computed tomography is used for implantation planning and prosthetics. In industry, computed tomography is used for quality control of products. In scientific research, computed tomography is used, for example, to examine pressure-retaining components of nuclear plants.

The task of computed tomography comprises the measurement of projection data of an object, placed on a tomographic setup, from multiple orientations. The projection data are subsequently processed to obtain a solution to the inverse tomography problem, which can be represented as a reconstructed CT image.

Many CT reconstruction algorithms assume that the attenuation of X-rays in a material depends linearly on the path length of probing radiation. Classical algorithms are based on integral or algebraic approaches, such as the Filtered Back Projection (FBP) or Algebraic Reconstruction Technique (ART), which are described in Kak et al., "Principles of Computerized Tomographic Imaging," IEEE Press, New York, NY, USA, 1988, which is hereby incorporated herein by reference as if set forth in full. New algorithms must be developed to measure objects with non-standard attenuation properties or in non-standard experimental conditions. See, e.g., Huang et al., "An evaluation of three commercially available metal artifact reduction methods for CT imaging," Physics in Medicine and Biology, 60(3):1047-67, 2015, and Dodge et al., "Performance evaluation of iterative reconstruction algorithms for achieving CT radiation dose reduction—a phantom study," Journal of Applied Clinical Medical Physics, 17(2):511-31, 2016, respectively, which are both hereby incorporated herein by reference as if set forth in full. Current development efforts have focused on improving algorithm properties, such as convergence or reconstruction quality. See, e.g., Kasai et al., "Tomographic image reconstruction based on minimization of symmetrized kullback-leibler divergence," Mathematical Problems in Eng'g, 2017(1564123), 8 pages, 2017, Tateishi et al., "Continuous analog of accelerated OS-EM algorithm for computed tomography," Mathematical Problems in Eng'g, 2017 (1564123), 8 pages, 2017, and Kojima et al., "Multivalued discrete tomography using dynamical system that describes competition," Mathematical Problems in Eng'g, 2017 (8160354), 9 pages, 2017, which are all hereby incorporated herein by reference as if set forth in full.

Projection data which satisfy linear models can be obtained by using only monochromatic X-ray probes. However, X-ray laboratory sources produce polychromatic beams. Therefore, data collected under laboratory conditions are not linear. The application of classical reconstruction algorithms to polychromatic data leads to different artifacts and distortions, such as "cupping" artifacts or artificial strips and lines between regions with strong absorption, as described in Stonestrom et al., "A framework for spectral artifact corrections in X-ray CT," IEEE Transactions on Biomedical Eng'g, 2:128-41, 1981, which is hereby incorporated herein by reference as if set forth in full. The main reason for the appearance of these artifacts is that the part of the radiation with low energy is fully absorbed by regions containing high-Z materials. This effect is known as beam hardening (BH) and is described in Brooks et al., "Beam hardening in X-ray reconstructive tomography," Physics in Medicine and Biology, 21(3):390-8, 1976, which is hereby incorporated herein by reference as if set forth in full. Brooks et al. show that data nonlinearity in tomographic reconstruction can exceed 10% of the average value. This noticeably limits the usage of computed tomography in tasks that require an estimate of, not only the global structure of the object, but the absorption value at every point in the structure.

For decades, scientists have sought to suppress these artifacts, caused by the polychromatic nature of the probing emissions. As a result, there are a lot of methods available for artifact suppression. These methods can be generally divided into five groups: hardware filtering; dual-energy scaling; preprocessing of projection data; reconstruction with iterative methods using a model of polychromatic radiation; and postprocessing of the reconstruction result.

The first group of methods uses hardware filtration. Specifically, metal objects are used as filters to partially absorb the low-energy radiation. The material and shape of each filter is highly dependent on the anode material, current, and peak voltage of the X-ray tube. Research in this group of methods is primarily directed towards improving the filters. See, e.g., Jennings, "A method for comparing beam-hardening filter materials for diagnostic radiology," Medical Physics, 15(4):588-99, 1988, and Chen et al., "A filter design method for beam hardening correction in middle-energy x-ray computer tomography," 8th Int'l Conference on Digital Image Processing, 10033:1003352, Int'l Society for Optics and Photonics, 2016, which are both hereby incorporated herein by reference as if set forth in full. While hardware filtration reduces artifacts caused by beam hardening effects, it also reduces the number of photons, which can result in a bad signal-to-noise ratio and cause CT image degradation.

The second group of methods use tomography setups with two X-ray tubes. See, e.g., Coleman et al., "A beam-hardening correction using dual-energy computed tomography," Physics in Medicine and Biology, 30(11):1251-6, 1985, Geet et al., "Quantitative analysis of reservoir rocks by microfocus X-ray computerised tomography," Sedimentary Geology, 132(1-2):25-36, 2000, and Yu et al., "Dual-energy CT-based monochromatic imaging," American Journal of Roentgenology, 199:S9-S15, 2012, which are all hereby incorporated herein by reference as if set forth in full. Two energies allow two sets of reconstruction results to be obtained: one for high energy; and one for low energy. Thus, it is possible to select the image highly dependent on Z, which gives a clue as to the sample material. However, this technique has high realization complexity and a strong sensitivity to noise. Another drawback is that X-ray radiation must be used twice for each object, which increases the scanning time, as well as the dose of radiation received by the object.

The third group of methods preprocesses the registered projection data, prior to reconstruction, based on calibration curves. The calibration curves are determined by measuring test objects. Herman, "Correction for beam hardening in computed tomography," Physics in Medicine and Biology, 24(1):81-106, 1979, which is hereby incorporated herein by reference as if set forth in full, suggested the use of a polynomial function of power two and three, with one parameter, to approximate the calibration curves. However, it was subsequently shown that, if the sample has high absorbing inclusion, a polynomial function of power eight or greater has to be used to approximate the calibration curves. See, e.g., Hammersberg et al., "Correction for beam hardening artefacts in computerised tomography," Journal of X-Ray Science and Technology, 8(1):75-93, 1998, which is hereby incorporated herein by reference as if set forth in full.

The fourth group of methods consists of iterative methods, including the correction procedure in the core of reconstruction. See, e.g., Brabant et al., "A novel beam hardening correction method requiring no prior knowledge, incorporated in an iterative reconstruction algorithm," NDT & E Int'l, 51:68-73, 2012, Jin et al., "A model-based image reconstruction algorithm with simultaneous beam hardening correction for X-ray CT," IEEE Transactions on Computational Imaging, 1(3):200-16, 2015, and Hsieh et al., "An iterative approach to beam hardening correction in cone beam CT," Medical Physics, 27(1):23-9, 2000, which are all hereby incorporated herein by reference as if set forth in full. These methods meet different handicaps and limitations, such as requiring knowledge about the sample or beam structure. However, the main drawback of these methods is the time of reconstruction.

The fifth group of methods postprocesses the reconstructed data. These methods use classical reconstruction algorithms and do not change the projection data. They are focused on the removal of artifacts from the reconstructed images. One of these methods is based on the blind deconvolution method, which is widely known in computer vision for the correction of blurred images. See, e.g., Xie et al., "Blind deconvolution combined with level set method for correcting cupping artifacts in cone beam CT," Medical Imaging 2017: Image Processing, 10133:101331Z, Int'l Society for Optics and Photonics, which is hereby incorporated herein by reference as if set forth in full. Another method from this group evaluates missing data using discrete cosine transformation and an anti-aliasing filter which preserves borders. See, e.g., Sarkar et al., "an empirical correction method for beam-hardening artifact in Computerized Tomography (CT) images," NDT & E Int'l, 102:104-13, 2019, which is hereby incorporated herein by reference as if set forth in full. The main drawback of this group of methods is that they all use image processing methods and do not account for image origin. Therefore, these methods may remove important information from the reconstructed image, as well as add nonexistent information to the reconstructed image.

SUMMARY

Accordingly, systems, methods, and non-transitory computer-readable media are disclosed for processing projection data, collected in a polychromatic mode, to reduce artifacts relevant to beam hardening without requiring additional calibration experiments.

In an embodiment, a method is disclosed that uses at least one hardware processor to: receive polychromatic projection data acquired by a computed tomography (CT) system; determine an optimal correction value for linearization of the polychromatic projection data; linearize the polychromatic projection data according to the determined optimal correction value; and reconstruct an image from the linearized projection data.

The polychromatic projection data may have at least three dimensions comprising: a number of detector rows; a number of detector columns; and a number of rotation angles. Determining the optimal correction value may comprise: extracting a portion of the polychromatic projection data; for each of a plurality of power values within a range of power values, correcting a line from the portion of the polychromatic projection data based on the power value, calculating a Radon invariant for every rotation angle in the number of rotation angles, calculating an average of the Radon invariants across all rotation angles in the number of rotation angles, calculating a root-mean-square of a ratio between the Radon invariant for each rotation angle and the average Radon invariant; and determining the optimal correction value based on the root-mean-squares calculated for all of the plurality of power values. Determining the optimal correction value based on the root-mean-squares calculated for all of the plurality of power values may comprise determining the optimal correction value as a power value corresponding to a minimum root-mean-square in the root-mean-squares calculated for all of the plurality of power values. Determining the optimal correction value as a power value corresponding to a minimum root-mean-square in the root-mean-squares calculated for all of the plurality of power values may comprise a brute-force search on all of the root-mean-squares calculated for all of the plurality of power values. The portion of the polychromatic projection data may comprise all polychromatic projection data that are within 5% of a distance range from a central projection in the polychromatic projection data. The portion of the polychromatic projection data may consist of only polychromatic projection data that are within 5% of a distance range from a central projection in the polychromatic projection data.

Linearizing the polychromatic projection data may comprise individually correcting each pixel in the polychromatic projection data.

Reconstructing the image may comprise applying a Fourier back transform (FBT) algorithm to the linearized projection data.

Reconstructing the image may comprise applying a filtered back projection (FBP) algorithm to the linearized projection data.

The polychromatic projection data may be linearized according to only a single correction value consisting of the determined optimal correction value.

Any of the methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3A illustrates a CT projection of an object, according to an experiment with an embodiment;

FIG. 3B illustrates a sinogram, according to an experiment with an embodiment;

FIG. 4 illustrates the behavior of criteria for different correction values, according to an experiment with an embodiment;

FIG. 7 illustrates a simulated X-ray spectra, according to an experiment with an embodiment;

FIG. 8 illustrates a cross-section of the Fe phantom, according to an experiment with an embodiment;

FIGS. 11A and 11B illustrate examples of reconstructed images without and with beam-hardening correction, respectively, according to an experiment with an embodiment;

FIG. 12 illustrates example cross-sections on a row of the reconstructed images in FIGS. 11A and 11B, according to an experiment with an embodiment;

FIG. 13A illustrates a tomographic projection, according to an experiment with an embodiment;

FIG. 13B illustrates a sinogram of a central cross-section in FIG. 13A, according to an experiment with an embodiment;

FIG. 14 illustrates the behavior of criteria for different correction values, according to an experiment with an embodiment;

FIG. 17 illustrates a mask for a region of interest, according to an experiment with an embodiment;

FIG. 18 illustrates the result of a calculation of standard deviation for a region of interest, according to an experiment with an embodiment;

FIG. 20 illustrates a reconstructed image, according to an experiment with an embodiment;

FIG. 21 illustrates a reconstruction result for a cross-section of a test object, according to an experiment with an embodiment;

FIG. 24A-24D illustrate the results of reconstruction on projection data for different power values, according to an experiment with an embodiment;

FIG. 25 illustrates the behavior of criteria for different correction values, according to an experiment with an embodiment;

FIG. 26 illustrates a mask, according to an experiment with an embodiment;

FIG. 27 illustrates a reconstruction result, according to an experiment with an embodiment; and FIG. 28 illustrates reconstruction results for different power values, according to an experiment with an embodiment.

DETAILED DESCRIPTION

In an embodiment, systems, methods, and non-transitory computer-readable media are disclosed for CT image reconstruction from polychromatic projection data. After reading this description, it will become apparent to one skilled in the art how to implement the invention in various alternative embodiments and for alternative uses. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Processing Device

Figure 1:
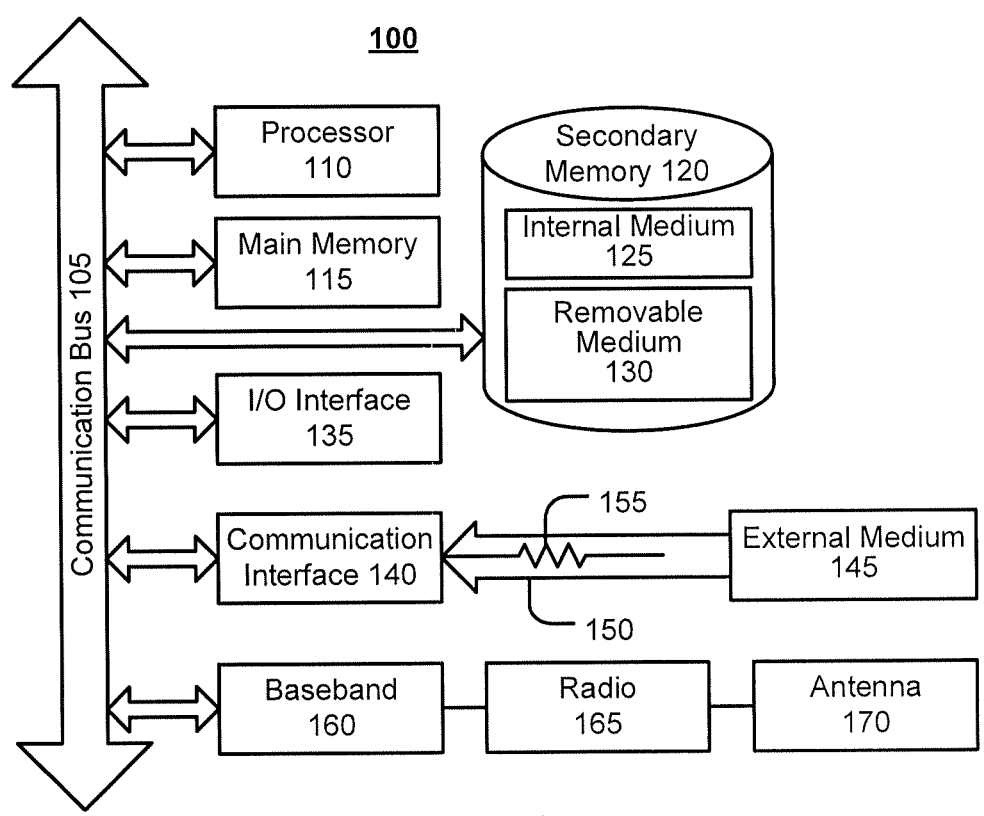
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used to execute one or more of the functions, processes, or methods described herein (e.g., one or more software modules of an application implementing the disclosed algorithm). System 100 can be a server (e.g., which services requests over one or more networks, including, for example, the Internet), a personal computer (e.g., desktop, laptop, or tablet computer), a mobile device (e.g., smartphone), a controller (e.g., in an autonomous vehicle, robot, etc.), or any other processor-enabled device that is capable of wired or wireless data communication. Other computer systems and/or architectures may be also used, as will be clear to those skilled in the art.

System 100 preferably includes one or more processors, such as processor 110. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, California.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 100 preferably includes a main memory 115 and may also include a secondary memory 120. Main memory 115 provides storage of instructions and data for programs executing on processor 110, such as one or more of the functions, processes, and/or modules discussed herein. It should be understood that programs stored in the memory and executed by processor 110 may be written and/or compiled according to any suitable language, including without limitation C/C++, Java, JavaScript, Perl, Visual Basic, NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., one or more software modules implementing the disclosed processes) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or executable code may be transferred to system 100 from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as one or more software modules implementing the disclosed processes) is stored in main memory 115 and/or secondary memory 120. Computer programs can also be received via communication interface 140 and stored in main memory 115 and/or secondary memory 120. Such computer programs, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and/or external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device, in the console of a vehicle, etc.).

In an embodiment, I/O interface 135 provides an interface to a camera (not shown), for example, system 100 may be a mobile device, such as a smartphone, tablet computer, or laptop computer, with one or more integrated cameras (e.g., rear and front facing cameras). Alternatively, system 100 may be a desktop or other computing device that is connected via I/O interface 135 to an external camera. In either case, the camera captures images (e.g., photographs, video, etc.) for processing by processor(s) 110 (e.g., executing the disclosed software) and/or storage in main memory 115 and/or secondary memory 120.

System 100 may also include optional wireless communication components that facilitate wireless communication over a voice network and/or a data network. The wireless communication components comprise an antenna system 170, a radio system 165, and a baseband system 160. In such an embodiment, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 may decode the signal and convert it to an analog signal. Then, the signal is amplified and sent to a speaker. Baseband system 160 may also receive analog audio signals from a microphone. These analog audio signals may be converted to digital signals and encoded by baseband system 160. Baseband system 160 can also encode the digital signals for transmission and generate a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 may also be communicatively coupled with processor 110, which may be a central processing unit (CPU). Processor 110 has access to data storage areas 115 and 120. Processor 110 is preferably configured to execute instructions (i.e., computer programs, such one or more software modules implementing the disclosed processes) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. Process Overview

Embodiments of processes for CT image reconstruction from polychromatic projection data will now be described. It should be understood that the described processes may be embodied as an algorithm in one or more software modules, forming an application that is executed by one or more hardware processors processor 110, for example, as a software application or library. The described processes may be implemented as instructions represented in source code, object code, and/or machine code. These instructions may be executed directly by the hardware processor(s) 110, or alternatively, may be executed by a virtual machine operating between the object code and the hardware processor(s) 110. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

2.1. Optimization Problem

If X-ray monochromatic radiation is used with an initial intensity $I_0$, then signal P collected by detector cell s, s∈S, wherein S represents the entire set of detector cells, can be described with the Beer-Lambert law as follows:

$$P(s,\alpha) = I_0 e^{-\int L\mu(l)dl} \qquad \text{Expression (1)}$$

wherein $\alpha$ is a rotation angle of the object, and L is the straight path of the probe from the source to the detector cell through the object, such that dl is a step. Two coordinates (s,α) fully specify the position of the probe with zero thickness and the probing direction.

Before reconstruction of the projection data, there is a linearization procedure:

$$R(s, \alpha) = \ln\left(\frac{I_0}{P(s, \alpha)}\right) = \int_L \mu(l)dl \qquad \text{Expression (2)}$$

wherein R(s,α) is an integral of function μ(l) along the direction of L, which is orthogonal to vector $\vec{n}$=(cos α, sin α). Thus, R is a function that describes the Radon transform. The Radon transform data is often called a sinogram, because the Radon transform of an off-center point source is a sinusoid. Most reconstruction algorithms work with sinograms.

The total intensity of all detector cells for a rotation angle α is:

$$T_\alpha = \sum_{s \in S} R(s, \alpha) \qquad \text{Expression (3)}$$

$T_\alpha$ equals the summation of the function μ(l) over the entire probing area, since the position of the probing beam depends on the coordinate s, which takes all values from its range. Therefore, the value of $T_\alpha$ is constant for every α∈A, thereby preserving the property of sinogram invariance relative to the rotation angle. This is the property of Radon invariant preservation.

However, tomographic scanners in laboratories typically use X-ray tubes with a polychromatic beam spectrum (i.e., a wide energy spectrum from the range [0, $E_{max}$]). In this case, the value registered by the detector is described as:

$$P(s, \alpha) = \int_0^{E_{max}} I_0(E)X(E)e^{-\int_L \mu(E,l)dl}dE \qquad \text{Expression (4)}$$

wherein $X(E)$ is a sensitivity function of the detector. Therefore, Expression (1) has been changed by an additional integral through energies. Since the local absorption function of the object μ(e,l) also depends on energy E, the projection data registered in polychromatic mode cannot be represented as an exact Radon transform of any object. The usage of standard reconstruction algorithms on polychromatic projection data leads to the appearance of artifacts.

To decrease these artifacts, a transformation must be found that linearizes the projection data:

$$f(P(s,\alpha)) = -\int_L \mu(l)dl \qquad \text{Expression (5)}$$

In an embodiment, one power approximation is used, as described in Chukalina et al., "Automatic beam hardening correction for CT reconstruction," Proceedings of the 31st European Conference on Modeling and Simulation, pp. 270-5, Budapest, Hungary, May 2017, which is hereby incorporated herein by reference as if set forth in full:

$$f = \left(\ln\left(\frac{\int_0^{E_{max}} I_0(E)X(E)dE}{P(s, \alpha)}\right)\right)^\gamma \qquad \text{Expression (6)}$$

wherein γ is the power value, and $\int_0^{E_{max}} I_0(E)X(E)dE$ is easily estimated from the values in the "empty" detector cells containing the non-attenuated initial beam.

If the power value γ is evaluated using the property of Radon invariant preservation, then the optimization problem is formulated as:

$$\sqrt{\frac{1}{A}\sum_{\alpha \in A}\left(\frac{\sum_{k \in S} f(P(s, \alpha))}{M\left[\sum_{k \in S} f(P(s, \alpha))\right]} - 1\right)^2} \to \min_f \qquad \text{Expression (7)}$$

wherein M[•] is an operator of a mean value.

2.2. Example Software Implementation

Figure 2:
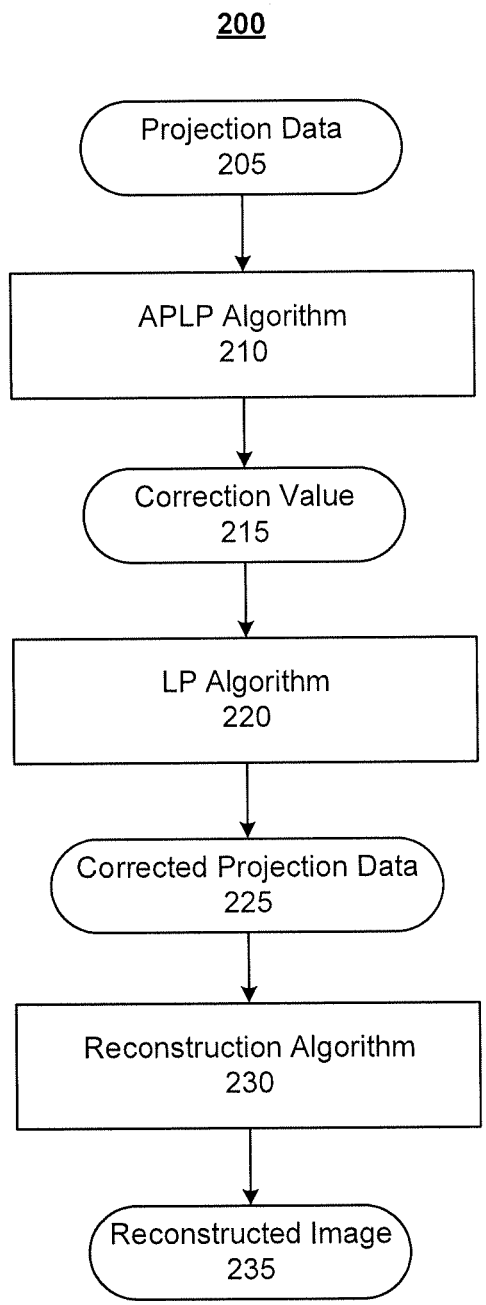
FIG. 2 illustrates an example process for reconstructing an image from polychromatic projection data, according to an embodiment.

FIG. 2 illustrates an example process 200 for reconstructing an image from polychromatic projection data, according to an embodiment. As illustrated, process 200 comprises three subprocesses: an adjustment parameter for linearization procedure (APLP) algorithm 210, a linearization procedure (LP) algorithm 220, and a reconstruction algorithm 230. APLP algorithm 210 receives polychromatic projection data 205 as input, finds the optimal correction value 215 for γ from polychromatic projection data 205, and outputs the found optimal correction value 215 to LP algorithm 220. LP algorithm 220 uses optimal correction value 215 to correct (linearize) projection data 205 to make projection data 205 closer to a linear model, and outputs corrected (linearized) projection data 225 to reconstruction algorithm 230. Reconstruction algorithm 230 reconstructs the corrected projection data 225 into a reconstructed image 235, and outputs reconstructed image 235.

To find optimal correction value 215, APLP algorithm 210 receives projection data 205 as an input. In an embodiment, projection data 205 has three dimensions N×M×K, in which N is the number of detector rows, M is the number of detector columns, and K is the number of rotation angles. Example pseudocode that implements an embodiment of APLP algorithm 210 follows:

| Example Implementation of APLP Algorithm |
|---|
| procedure APLP(P) |
| input: P is the projection data, with a size of N × M × K. |
| output: ỹ is the adjustment beam-hardening correction parameter. |
| P' = {$p_{ijz}$ ∈ P : i = [0.45N, 0.55N]; j = [1, M]; z = [1, K]}; |
| $a_z$ ← ∀z ∈ [1, K]; |
| $m_i$ ← 0 ∀i ∈ [0.45N, 0.55N]; |
| $d_i$ ← 0 ∀i ∈ [0.45N, 0.55N]; |
| $D^\gamma$ ∀γ ∈ [0, 500]; |
| for All i ∈ [0.45N, 0.55N] do |
|   $P'_i$ = {$p'_{i'jz}$ ∈ P' : i' = i, j = [1, M]; z = [1, K]}; |
|   for All γ ∈ [0, 500] do |
|     $S^\gamma$ ← LC($P'_i$, 1 + γ/100); |
|     for All z ∈ [1, K] do |
|       $a_z$ ← $\Sigma_{j=1}^M s_{ijz}$; |
|     $m_i$ ← (1/K) $\Sigma_{z=1}^K a_z$ ; |
|     $d_i$ ← $\sqrt{(1/K) \Sigma_{z=1}^K (a_z/m_i - 1)^2}$ ; |
|     $D^\gamma$ += $d_i^\gamma$ ; |
|   $D^\gamma$ ← $D^\gamma$ /0.1N; |
| ỹ ← 1 + arg $\min_\gamma D^\gamma$ /100. |

On the initial setup of APLP algorithm 210, a portion P' of projection data 205 that is within 500 of the distance range from the central projection is selected. If the tomography task is two-dimensional, then APLP algorithm 210 is executed for all projection data (i.e., one line). APLP algorithm 210 may search for the power value ỹ in a range (e.g., [1.00, 6.00]) with a step (e.g., equal to 0.01). Every line from the part of the projection data P' is corrected with the current power value as 1+γ/100. For this, LP algorithm 220 may used, as described elsewhere herein. Next, the Radon invariant is calculated for every angle mi, the Radon invariant is averaged, and the root-mean-square of the ratio between the Radon invariant for every angle di and the average Radon invariant mi is calculated. Optimal correction value 215 may be found using a brute force search over the range Dy. A brute force search may be used since there is no obvious reason to believe that the dependence between the value and the Radon invariant is differentiable and has only one minimum. As a result of APLP algorithm 210, optimal correction value 215 is obtained for correcting (linearizing) projection data 205.

In an embodiment, LP algorithm 220 is used for correcting (linearizing) polychromatic projection data 205 based on the optimal correction value 215 found by APLP algorithm 210. Example pseudocode that implements an embodiment of LP algorithm 220 follows:

| Example Implementation of LP Algorithm | |
|---|---|
| procedure | LP(P, γ) |
| input: | P is the projection data, with a size of N × M × K, γ is the beam-hardening correction factor. |
| output: | S is the corrected sinogram, with a size of N × M × K. for All $p_{ijz} \in P$ do $\tilde{p}_{ijz} \leftarrow - \ln p_{ijz}$ ; $s_{ijz} \leftarrow (\tilde{p}_{ijz})^\gamma$. |

Inputs parameters for LP algorithm 220 are polychromatic projection data 205 (i.e., P) and the optimal correction value 215 (e.g., γ representing the power value for data correction). Each pixel of projection data 205 is corrected independently from all other pixels of projection data 205. In other words, the correction in LP algorithm 220 is performed pixel by pixel to produce corrected projection data 225.

In an embodiment, the FBT algorithm or a filtered back projection (FBP) algorithm is used as reconstruction algorithm 230 to generate a reconstructed image 235 from corrected projection data 225. However, any reconstruction algorithm may be used for corrected projection data 225 that works in the paradigm of linearized data. Process 200 will also complement modified reconstruction algorithms that are focused on suppressing another type of artifact, such as artifacts arising from disturbances in the geometry of the CT set-up or the presence of high-level noise.

3. Experimental Results

The experimental results of one or more particular implementations of disclosed embodiments will now be discussed. The dimensions of objects used in the experiment were 7×7×12 millimeters. Polychromatic projection data 205 for the experiments were acquired by the micro-tomograph system assembled in the "Crystallography and Photonics" Federal Scientific Research Center (FSRC) of the Russian Academy of Science (RAS), as described in Buzmakov et al., "Monochromatic computed microtomography using laboratory and synchrotron sources and X-ray fluorescence analysis for comprehensive analysis of structural changes in bones," Journal of Applied Crystallography," 48(3):693-701, 2015, which is hereby incorporated herein by reference as if set forth in full. An X-ray tube, with a molybdenum (Mo) anode as a radiation source, and a vacuum gauge for intensity stability were used. Projections were collected with a xiRay 11-Mpix detector from XIMEA GmbH, headquartered in Munster, Germany. The measurement mode parameters for the tube were 40 kV voltage and 20 mA current, with 5-second acquisition time per frame. The source-to-object distance was 1.2 meters, and the object-to-detector distance was 0.05 meters. Every rotational scan consisted of 400 projections with a constant angular step size of 0.5 degrees. The detector pixel resolution was 9 μm. The geometrical configuration of the experiment was such that the X-ray beam can be considered as parallel, since the angle of divergence is less than one degree. See Mueller, "Fast and accurate three-dimensional reconstruction from cone-beam projection data using algebraic methods," doctoral thesis, The Ohio State University, 1998, which is hereby incorporated herein by reference as if set forth in full. No filter or other optics were used to produce a monochromatic beam. Consequently, the work mode was polychromatic.

FIG. 3A illustrates a CT projection of a sample object used in the experiment. Line 300 indicates the cross-sections chosen for the two-dimensional reconstruction. FIG. 3B illustrates the sinogram pertaining to the cross-sections represented by line 300 in FIG. 3A. In the experiment, process 200 was applied to the registered projection data 205 for the sample object represented in FIGS. 3A and 3B.

FIG. 4 illustrates the behavior of criteria for different correction values. More specifically, FIG. 4 depicts the dynamics of the normalized root mean square error deviation (NRMSD). The minimum value was 1.83, which represents optimal correction value 215. This optimal correction value 215 is consistent with suggestions to use the value 2.0 when weak absorption coefficient inclusions are presented in an investigated object, and raising the value when highly absorbing inclusions are presented in the investigated object. With the optimal correction value 215 found by APLP algorithm 210, projection data 205 was corrected to generate corrected projection data 225 for input to reconstruction algorithm 230.

Figure 5A:
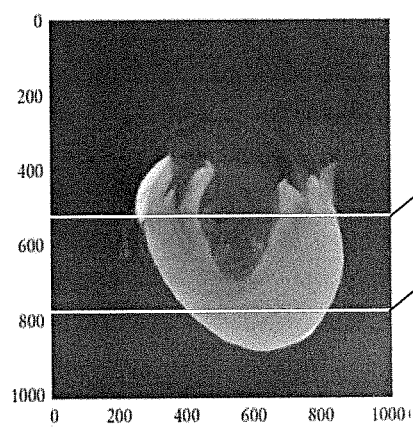
FIGS. 5A and 5B illustrate examples of reconstructed images without and with beam-hardening correction, respectively, according to an experiment with an embodiment.
Figure 5B:
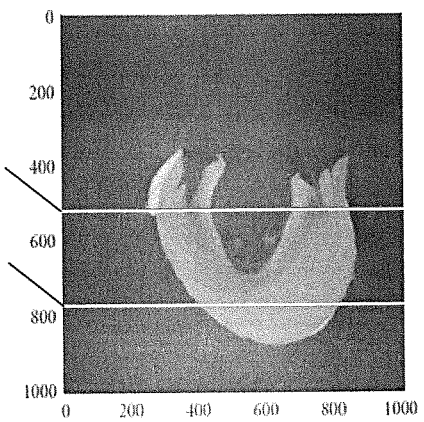

In one experiment, the FBP algorithm was used as reconstruction algorithm 230 on corrected projection data 225 for a CT scan of a tooth. The software implementation for the Python™ language is presented in the ASTRA Toolbox Library, as descried in Aarle et al., "Fast and flexible X-ray tomography using the ASTRA toolbox," Optics Express, 24(22):25129-147, 2016, which is hereby incorporated herein by reference as if set forth in full. FIG. 5A illustrates an example of the reconstructed image 235 for the tooth without beam-hardening correction, whereas FIG. 5B illustrates an example of the reconstructed image 235 for the same tooth with beam-hardening correction using the disclosed data linearization of process 200.

Figure 6A:
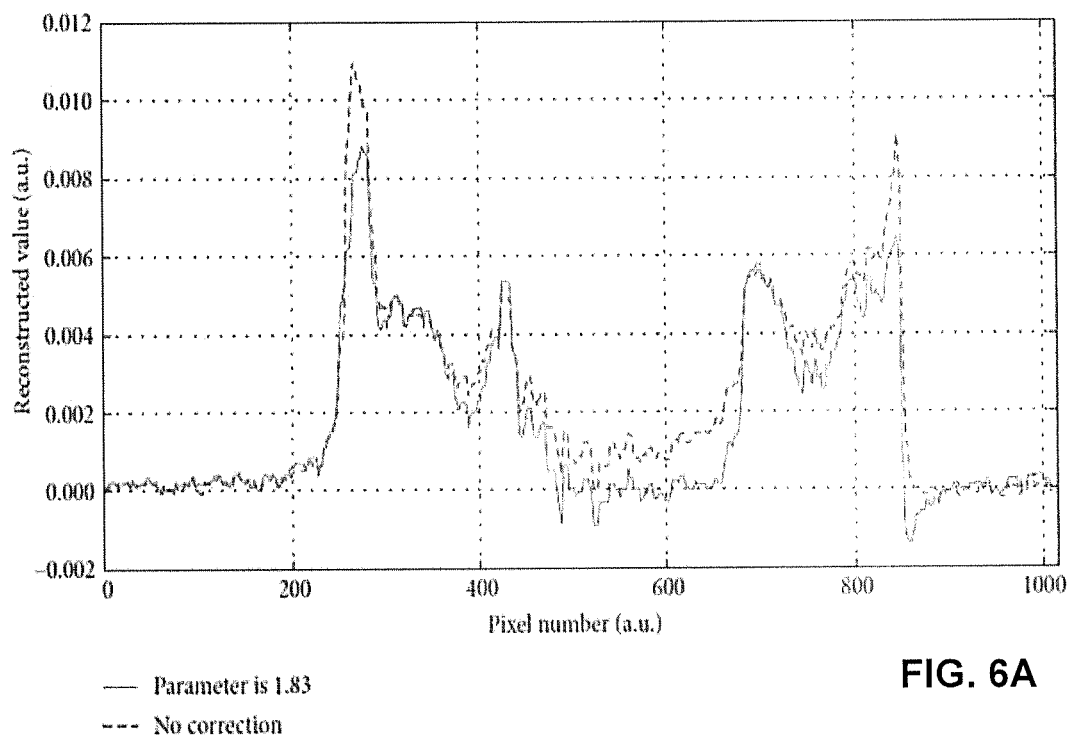
FIGS. 6A and 6B illustrate example cross-sections on rows of the reconstructed images in FIGS. 5A and 5B, according to an experiment with an embodiment.
Figure 6B:
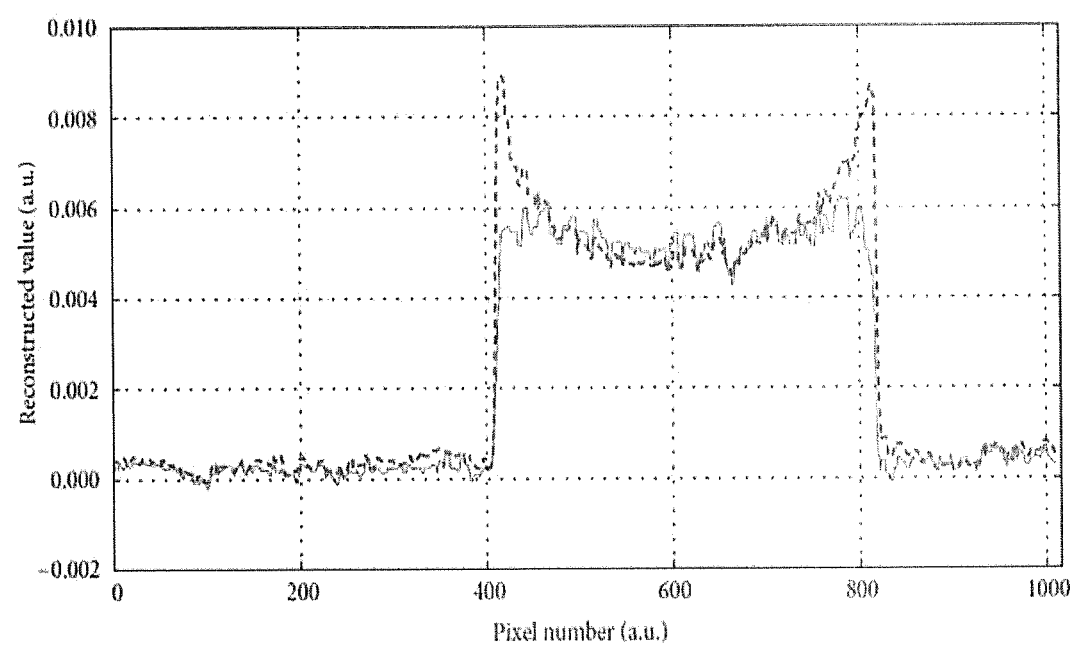

FIG. 6A illustrates the respective cross-section on row 520 of reconstructed image 235, and FIG. 6B illustrates the respective cross-section on row 780 of reconstructed image 235. As shown in the cross-section on row 520 in FIG. 6A, the hollow part inside the tooth has an absorption coefficient that is greater than the space outside the tooth in the reconstructed image without beam-hardening correction (FIG. 5A). In contrast, in the cross-section of the reconstructed image 235 with beam-hardening correction (FIG. 5B), the absorption coefficients of the space outside the tooth and the hollow part inside the tooth are the same. Moreover, the absorption coefficient of the tooth itself remains unchanged.

In addition, as shown in the cross-section on row 780 in FIG. 6B, the cupping artifact is brightly expressed in the reconstructed image without beam-hardening correction (FIG. 5A). In contrast, in the cross-section of the reconstructed image 235 with beam-hardening correction (FIG.

5B), the cupping artifact is completely suppressed. Moreover, the absorption coefficient of the inner part remains unchanged.

The simulation results were used to test process 200 under high-absorption conditions. The spectrum of a 100 kV voltage X-ray tube, with a tungsten (W) anode as the radiation source, was calculated using the Tungsten Anode Spectral Model using Interpolated Polynomials (TASMIP) Spectra Calculator, as described in Punnoose et al., "Technical note: spektr 3.0—A computational tool for x-ray spectrum modeling and analysis," Medical Physics, 43(8): 4711-17, 2016, which is hereby incorporated herein by reference as if set forth in full. FIG. 7 illustrates the simulated X-ray spectra.

Figure 9:
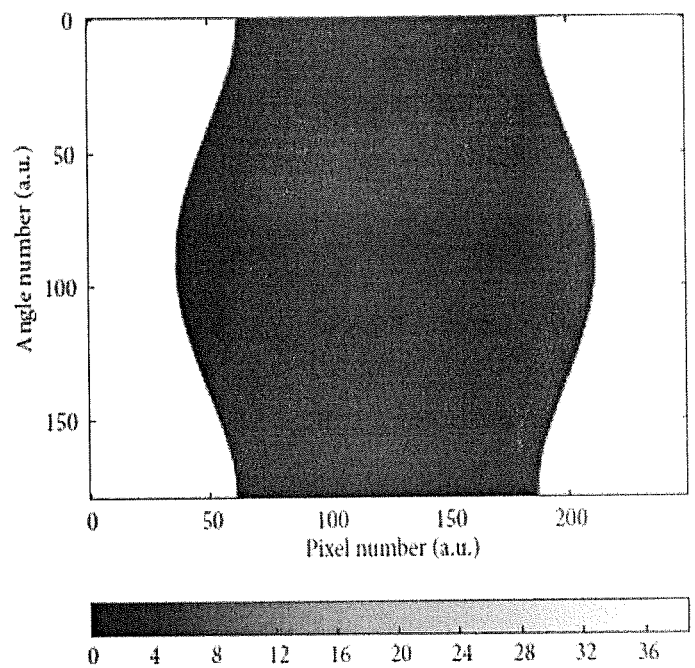
FIG. 9 illustrates a sinogram for the Fe phantom in FIG. 8, according to an experiment with an embodiment.
Figure 10:
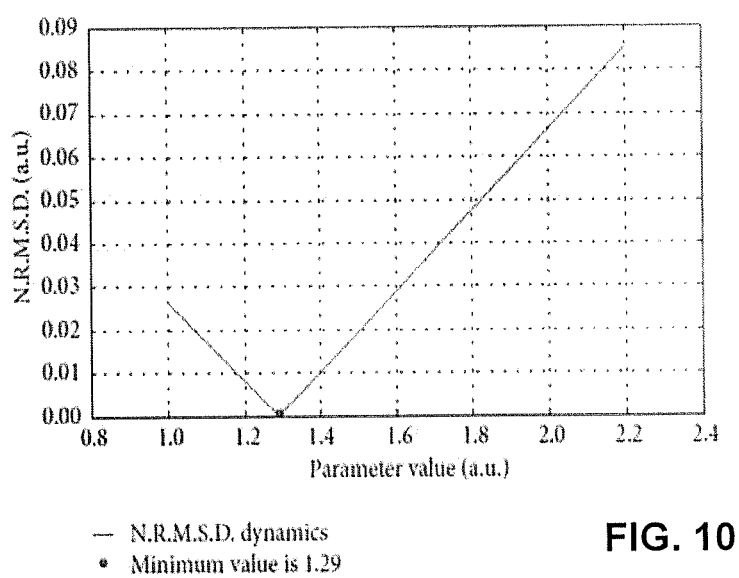
FIG. 10 illustrates the behavior of criteria for different correction values, according to an experiment with an embodiment.

FIG. 8 illustrates the cross-section of the Fe phantom that was used to calculate the projections in a parallel scheme, according to a particular experiment. In this experiment, the ASTRA toolbox was used to calculate the projections. The size of the Fe phantom was 250 pixels, with a pixel size of 28 μm. The number of evenly spaced projection angles was 180, with a rotation angle value of one degree. FIG. 9 illustrates the calculated sinogram. FIG. 10 illustrates the behavior of criteria for different correction parameter values. The minimum of Expression (7) is achieved at 1.29.

In the experiment, an FBP algorithm was used as reconstruction algorithm 230. FIG. 11A illustrates an example of the reconstructed image 235 without beam-hardening correction, whereas FIG. 11B illustrates an example of the reconstructed image 235 with beam-hardening correction using the disclosed data linearization of process 200 (with $\gamma=1.29$). FIG. 12 illustrates the respective cross-sections on row 125 of reconstructed image 235 with and without beam-hardening correction.

In the experiment, after reliability inspection under high-absorption conditions, process 200 was used for data collected during a tomographic scan. Steel alloy with a nickel-plated coating (i.e., a test object) was scanned in cone beam geometry, as described in Gongadze et al., "Alignment and resolution studies of a MARS CT scanner," Physics of Particles and Nuclei Letters, 12(5):725-35, 2015, which is hereby incorporated herein by reference as if set forth in full. An X-ray laboratory source with a W anode was used. The source-to-object distance was 128.5 mm, and the source-to-detector distance was 228 mm. Every rotational scan consisted of 360 projections with a constant angular step size of one degree. The detector pixel size was 0.055 mm.

FIG. 13A illustrates the tomographic projection, and FIG. 13B illustrates a sinogram of the central cross-section represented by line 1300 in FIG. 13A. Process 200 was applied to the registered projection data 205 for the test object represented in FIGS. 13A and 13B. FIG. 14 illustrates the behavior of criteria for different correction parameter values. As illustrated, optimal correction value 215 was found to be 1.95.

Figure 15A:
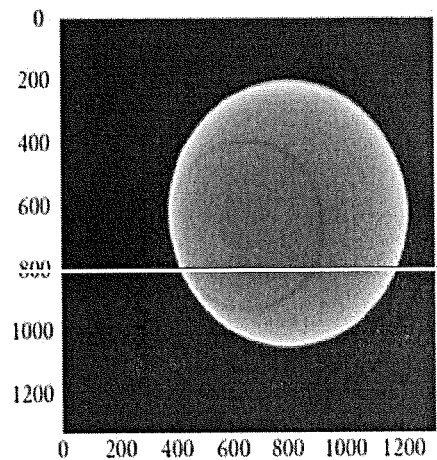
FIGS. 15A and 15B illustrate examples of reconstructed images without and with beam-hardening correction, respectively, according to an experiment with an embodiment.
Figure 15B:
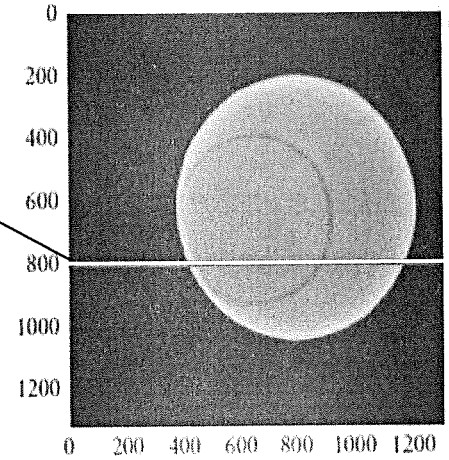
Figure 16:
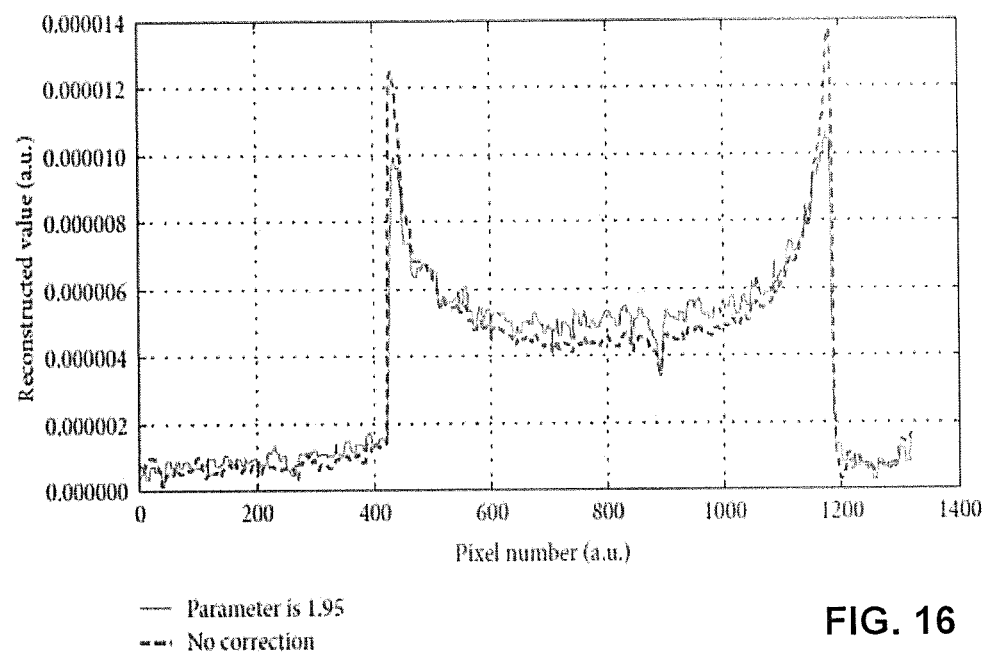
FIG. 16 illustrates example cross-sections on a row of the reconstructed images in FIGS. 15A and 15B, according to an experiment with an embodiment.

In the experiment, an FBP algorithm was used as reconstruction algorithm 230. FIG. 15A illustrates an example of the reconstructed image 235 without beam-hardening correction, whereas FIG. 15B illustrates an example of the reconstructed image 235 with beam-hardening correction using the disclosed data linearization of process 200 (with $\gamma=1.95$). FIG. 16 illustrates the respective cross-sections on row 800 of reconstructed image 235 with and without beam-hardening correction. Since the object has a nickel-plated coating, two areas in FIG. 16 illustrate the result of beam-hardening correction. The first area is the near-boundary area, at approximately 400 pixels and 1200 pixels, and the second area is the center area. The ring inside the reconstructed area is explained by defects in some pixels of the detector that was used, as described in Kozhevnikov et al., "Equalization of Medipix family detector energy thresholds using X-ray tube spectrum high energy cut-off," Journal of Instrumentation, 14(01):T01006, 2019, which is hereby incorporated herein by reference as if set forth in full.

The optimality of the found correction value 215 was verified. To illustrate this verification process, projection data 205 from the baby's tooth illustrated in FIGS. 5A and 5B will be used. In a first step, the region of interest (ROI) on the reconstructed image 235 was selected. The value inside this region of interest should be homogeneous. FIG. 17 illustrates the ROI mask that was created in the experiment. In a second step, the standard deviation and mean value within the region of interest in reconstructed image 235 was calculated. Two-dimensional reconstruction of the selected CT image slice was performed with parameters of the correction function in the range of [1.0, 2.8]. Then, the standard deviation in the region of interest was calculated. FIG. 18 illustrates the results of this calculation. The dot in FIG. 18 indicates the standard deviation for optimal correction value 215.

The verification process demonstrated that the found correction value 215 was the optimal correction value. Experiments with real data confirmed that this approach was applicable. Notably, this process is sensitive to distortions that violate the property of conservation of the Radon invariant. These distortions include thermal drift of the center of the X-ray spot and/or a weak signal-to-noise ratio. On the other hand, the process is resistant to artifacts such as the displacement of the center of rotation.

Another way to evaluate the manifestation rate of the cupping artifact on a region of interest in a reconstructed image 235 is to estimate the error based on a seminorm in the $W_2^1$ space:

$$\|\mu_{fit}\|_{W_2^1} = \left\{ \int_a^b \mu_{fit}'^2(t) dt \right\}^{1/2} \qquad \text{Expression (8)}$$

in the region of interest.

Figure 19:
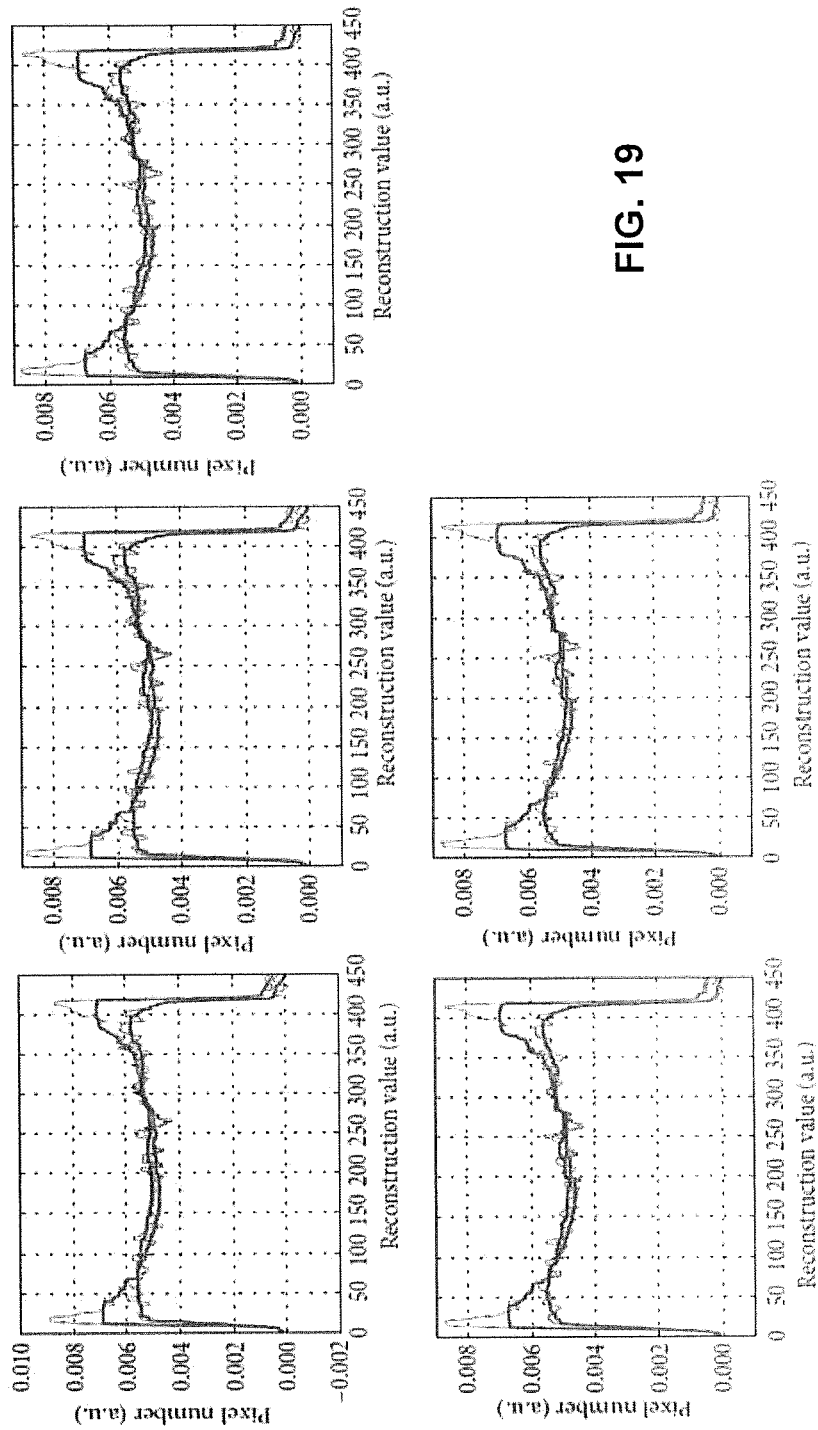
FIG. 19 illustrates the evaluation of a cupping artifact manifestation in a region of interest, according to an experiment with an embodiment.

To calculate the derivative, the data was fitted to exclude salt-and-pepper noise from consideration. FIG. 19 illustrates the evaluation of the cupping artifact manifestation in the region of interest. To evaluate the potential gain of the cupping effect reduction, several different filter types were used to substitute for the ramp filter in FBP reconstruction. From left-to-right and top-down in FIG. 19, the filters illustrated are the Hann, Hamming, Ram-Lak, Shepp-Logan, and cosine filters. For each, the cupping effect is reduced by approximately three times.

To demonstrate the decrease in artifacts relevant to beam-hardening, process 200 was applied to the data collected with the tomography set-up at FSRC "Crystallography and Photonics" RAS, data provided by colleagues from the Joint Institute for Nuclear Research in Dubna, and simulated data. The first set of data is tomographic projections of baby teeth. The main reason for selecting teeth was related to the fact that the presence of artifacts on CT images of teeth is a serious problem when choosing a treatment regimen and when planning implantation procedures. See, e.g., Vasconcelos et al., "Artefact expression associated with several cone-beam computed tomographic machines when imaging root filled teeth," Int'l Endodontic Journal, 48:994-1000, 2015, which is hereby incorporated herein by reference as if set forth in full. A reason for selecting baby teeth is due to the fact that a baby's tooth has a cavity formed by non-resorbed roots. This enabled the evaluation of process 200 both in the cross-section passing through the cavity (FIGS. 5A and 5B) and in the cross-section passing through the dense part of the object. The second set of data was the projection data of test steel alloy with nickel-plated coatings. The main reason for including these specimens in the consideration was the high absorption. The results allowed for the conclusion that process 200, which does not require additional calibration experiments, enables the reduction of beam-hardening artifacts in reconstructed images 235. To verify the effectiveness of process 200, an FBP algorithm was used to reconstruct images from projection data that had been corrected with different power values. The solution of the optimization problem is in line with the minimum position of the standard deviation.

4. Supplemental Information

Additional information, which may be helpful to an understanding of disclosed embodiments, will now be provided.

4.1. Link Between Single-Parameter Correction and Radon Invariant

Classical fast reconstruction algorithms assume that the attenuation of the incident X-ray beam is exponentially related to the thickness of the object, due to Beer's Law. However, this is incorrect for polychromatic X-ray sources. For polychromatic X-ray sources, lower energy photons are more attenuated than higher energy photons (e.g., hard X-rays) when the beam passes through the object. Thus, the attenuation produced by a homogeneous sample, defined as the negative logarithm of the ratio of transmitted-to-incident beam, is not strictly proportional to its thickness, and results in beam hardening. This measured nonlinear relationship can be fitted. See, e.g., Herman, "Correction for beam hardening in Computer Tomography," Phys. Med. Biol. 24(1):81-106, 1979, which is hereby incorporated herein by reference as if set forth in full.

To state the problem of beam-hardening correction, the mathematical model of the signal formation (i.e., a point in the projection space) can be written for the polychromatic case, assuming that the object under study is uni-component but its distribution inside the volume is nonuniform:

$$I = \int dE I_0(E) v(E) \exp(-\int_L \mu(E) C(l) dl) \quad \text{Expression (9)}$$

wherein I is a point in the projection space or value measured by a detector pixel, $I_0(E)$ is the original intensity of the spectrum component with energy E, function $v(E)$ describes the detector response at energy E, the direction to the detector pixel is determined by $\int_L$, $\mu(E)$ is the linear attenuation coefficient of the component at energy E, and $C(l)$ assigns its concentration along L.

Assuming that $I_0(E)$, $v(E)$, and $\mu(E)$ are known from the reference measurements, Expression (9) can be rewritten as:

$$I = f(\int C(l) dl) = f(R(C)) \quad \text{Expression (10)}$$

wherein R is the Radon transform. Thus, the general statement of the problem is to find $f^{-1}$ in:

$$R(C) = f^{-1}(I) \quad \text{Expression (11)}$$

If the reconstructed image is described by function H, then the reconstruction problem is:

$$H = R^{-1}(I^*) \quad \text{Expression (12)}$$

For practical purposes, the following approximation may be used to correct the beam hardening:

$$I^* = \left( \ln \left( \frac{\int dE I_0(E) v(E)}{I} \right) \right)^\gamma \quad \text{Expression (13)}$$

wherein the value $\int dE I_0(E) v(E)$ may be estimated in the pixels that are free from the object.

In a particular experiment, to demonstrate the influence of different values of $\gamma$ on the reconstruction result, projection data was acquired for a test object that was placed in a vial. FIG. 20 illustrates the reconstructed image for $\gamma=1.6$. The FDK reconstruction algorithm, described in Feldkamp et al., "Practical Cone-beam Algorithm," J. of the Optical Society of America 1, 612-9, which is hereby incorporated herein by reference as if set forth in full, was applied to the acquired projection data. Finding the optimal value for parameter $\gamma$ using visual control can be complicated. FIG. 21 illustrates the reconstruction result for a cross-section of the test object using different values of $\gamma$. The presence of the cupping effect in the reconstruction result is informative of the under-compensation for linearization.

Accordingly, in an embodiment, an algorithm is used to find the optimal value of parameter $\gamma$. It should be understood that this algorithm represents an implementation of APLP algorithm 210, and the optimal value of parameter $\gamma$ that is found by the algorithm may represent found correction value 215. Specifically, the sum of I* values over all pixels for each CT projection is calculated, resulting in the value SUMP for each projection angle $\phi$. The mean of SUMP is close to the Radon invariant, whose conceptual origin is in the monochromatic case. As polychromatic projection data is compensated by Expression (13), the minimum total error distance should be minimized, in order to be able to use reconstruction algorithms developed for monochromatic projection data. To estimate the optimal value of parameter $\gamma$ ($\gamma \in [1, 2]$), the root-mean-square deviation of the random value $SUM\gamma^\phi$, from the mean $M(SUM\gamma^\phi)$, divided by the mean $M(SUM\gamma^\phi)$ (i.e., NRMSD) is minimized.

4.2. Simulation Results

Figure 22:
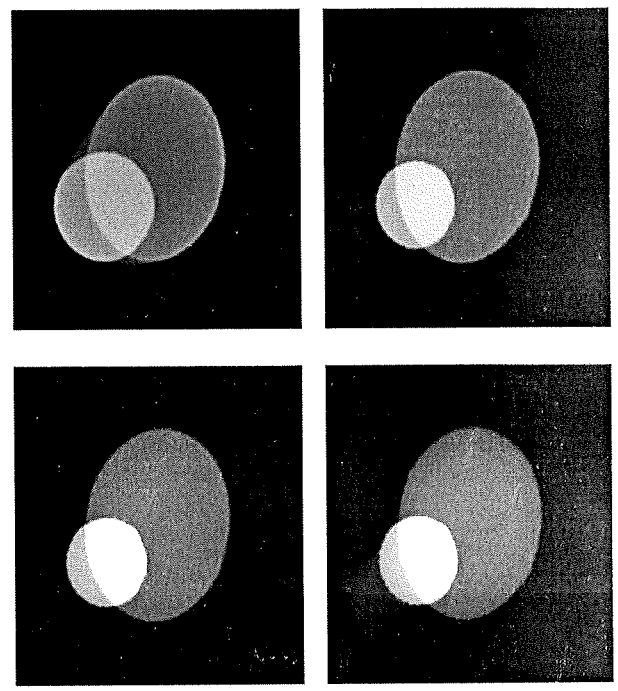
FIG. 22 illustrates reconstructed images for simulated projection data using different power values, according to an experiment with an embodiment.
Figure 23:
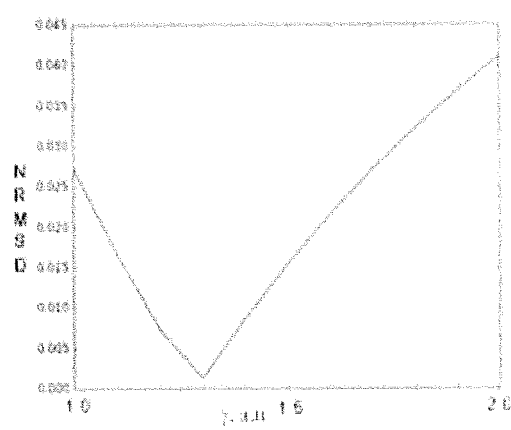
FIG. 23 illustrates the behavior of criteria for different correction values, according to an experiment with an embodiment.

Simulated projection data was used to test the behavior of the algorithm of process 200. FIG. 22 illustrates the reconstructed images for the simulated projection data using values for parameter $\gamma$ of 1.0, 1.3, 1.6, and 1.9. The geometry of the phantom used to calculate the polychromatic sinograms should be clear from FIG. 22. The image size was 208 by 208 pixels. The monochromatic CT projections were calculated in fun geometry. The value used to simulate the polychromaticity was 1.3. FIG. 23 illustrates the NRMSD criterion behavior for the simulated projection data. As shown, the minimum corresponds to the proper value of $\gamma=1.3$.

4.3. Results for Real CT Data

The test object was measured with a CT scanner, and the projection data were collected at 2,030 rotation angles with a size of 2096×4000. FIGS. 24A-24D illustrate the results of reconstruction on the simulated projection data for different values of parameter $\gamma$. Specifically, FIG. 24A is a full cross-section for $\gamma=1$, FIG. 24B is a part of the inverted image for $\gamma=1$, FIG. 24C is a part of the inverted image for $\gamma=1.3$, and FIG. 24D is a part of the inverted image for $\gamma=1.6$. FIG. 25 illustrates the NRMSD criterion behavior for real CT projection data. Notably, there is a well-pronounced minimum on the curve.

4.4. Estimation of Cupping Artifact for Optimal and Non-Optimal Values

Beam-hardening correction should decrease the cupping artifact in reconstructed images. Nikolaev et al., "CT Image Quality Assessment based on Morphometric Analysis of Artifacts," in Proceedings of the Int'l Conference on Robotics and Machine Vision (ICRMV), Moscow, Russia, Sep. 14-16, 2016, Proc. SPIE 10253, Feb. 8, 2017, doi:10.1117/12.2266268, which is hereby incorporated herein by reference as if set forth in full, describes criteria to estimate the severity of the cupping artifact. Since cupping artifacts only occur inside dense objects, a mask was designed for the object. To estimate the value of the cupping artifact, a morphometric parameter CA was calculated over the selected region corresponding to the mask.

FIG. 26 illustrates a mask M with K homogeneous objects, and FIG. 27 illustrates the reconstruction result, corresponding to the central i-th object of the mask, with the mask boundary. The distance transform ($DT^1, \ldots DT^k$) was calculated for each object of the mask, based on the Euclidean metric. If the beam hardening fully compensated, the pixels inside the homogeneous object should have the same values. Let $I_j^k$ be a value of the j-th pixel of $M^k$ mask area. A base value may be calculated as the mean value within a stable region:

$$\text{Base}V^k = \text{mean}\{I_j^k | DT_j^k > \text{Val}^k\} \quad \text{Expression (14)}$$

wherein $\text{Val}^k = 0.9 \max(DT^k)$.

The histogram of the distance transform of $M^k$ can be calculated as:

$$CE^k = \Sigma_{v=1}^{0.2\ max(DTk)} |\text{mean}\{I_j^k | v-1 < DT_j^k < v\} - \text{Base}V^k| \quad \text{Expression (15)}$$

The average value over all objects is the areal morphometric parameter CA that represents a measure of the severity of the cupping artifact:

$$CA = 1/k \Sigma_{k=1}^{K} CE^k$$

FIG. 28 illustrates the reconstruction results for different values of parameter γ to illustrate the execution of the algorithm. Specifically, from bottom to top in FIG. 28, γ was 1.0, 1.3, 1.6, and 1.9. The criteria account for all masked parts of the object under investigation.

5. Example Embodiment

Standard approaches to CT reconstruction of projection data, registered with polychromatic emission, lead to the appearance of cupping artifacts and irrelevant lines between regions of strong absorption. The main reason for the appearance of these artifacts is the fact that part of the emission with low energy is being absorbed entirely by high-absorbing objects. This fact is known as beam-hardening.

Accordingly, a process (e.g., process 200) for processing projection data (e.g., projection data 205), collected in a polychromatic mode, is disclosed. Advantageously, the disclosed process reduces artifacts relevant to beam-hardening without requiring additional calibration experiments. In an embodiment, the process comprises two steps: (1) linearize the projection data with one-parameter power correction; and (2) reconstruct the images from linearized data. One main advantage of this process is automatic parameter adjustment. In the above description, the optimization problem was formulated, the system was presented, and reconstruction with different powers of correction were considered to evaluate the quality of the reconstruction produced by the disclosed process.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive polychromatic projection data acquired by a computed tomography (CT) system, wherein the polychromatic projection data has at least three dimensions comprising a number of detector rows, a number of detector columns, and a number of rotation angles;
   determine an optimal correction value for linearization of the polychromatic projection data, wherein determining the optimal correction value comprises
      extracting a portion of the polychromatic projection data,
      for each of a plurality of power values within a range of power values,
         correcting a line from the portion of the polychromatic projection data based on the power value,
         calculating a Radon invariant for every rotation angle in the number of rotation angles,
         calculating an average of the Radon invariants across all rotation angles in the number of rotation angles, and
         calculating an error measure of a ratio between the Radon invariant for each rotation angle and the average Radon invariant, and
      determining the optimal correction value based on the error measures calculated for all of the plurality of power values;
   linearize the polychromatic projection data according to the determined optimal correction value; and
   reconstruct an image from the linearized projection data.

2. The method of claim 1, wherein determining the optimal correction value based on the error measures calculated for all of the plurality of power values comprises determining the optimal correction value as a power value corresponding to a minimum error measure in the error measures calculated for all of the plurality of power values.

3. The method of claim 2, wherein determining the optimal correction value as a power value corresponding to a minimum error measure in the error measures calculated for all of the plurality of power values comprises a brute-force search on all of the error measures calculated for all of the plurality of power values.

4. The method of claim 1, wherein the portion of the polychromatic projection data comprises all polychromatic projection data that are within 5% of a distance range from a central projection in the polychromatic projection data.

5. The method of claim 1, wherein the portion of the polychromatic projection data consists of only polychromatic projection data that are within 5% of a distance range from a central projection in the polychromatic projection data.

6. The method of claim 1, wherein linearizing the polychromatic projection data comprises individually correcting each pixel in the polychromatic projection data.

7. The method of claim 1, wherein reconstructing the image comprises applying a filtered back projection (FBP) algorithm to the linearized projection data.

8. The method of claim 1, wherein the polychromatic projection data is linearized according to only a single correction value consisting of the determined optimal correction value.

9. A system comprising:
at least one hardware processor; and
one or more software modules configured to, when executed by the at least one hardware processor,
receive polychromatic projection data acquired by a computed tomography (CT) system, wherein the polychromatic projection data has at least three dimensions comprising a number of detector rows, a number of detector columns, and a number of rotation angles,
determine an optimal correction value for linearization of the polychromatic projection data, wherein determining the optimal correction value comprises
extracting a portion of the polychromatic projection data,
for each of a plurality of power values within a range of power values,
correcting a line from the portion of the polychromatic projection data based on the power value,
calculating a Radon invariant for every rotation angle in the number of rotation angles,
calculating an average of the Radon invariants across all rotation angles in the number of rotation angles, and
calculating an error measure of a ratio between the Radon invariant for each rotation angle and the average Radon invariant, and
determining the optimal correction value based on the error measures calculated for all of the plurality of power values,
linearize the polychromatic projection data according to the determined optimal correction value, and
reconstruct an image from the linearized projection data.

10. A non-transitory computer-readable medium having instructions stored therein, wherein the instructions, when executed by a processor, cause the processor to reconstruct a computed tomography (CT) image by:
receiving polychromatic projection data acquired by a computed tomography (CT) system, wherein the polychromatic projection data has at least three dimensions comprising a number of detector rows, a number of detector columns, and a number of rotation angles;
determining an optimal correction value for linearization of the polychromatic projection data, wherein determining the optimal correction value comprises
extracting a portion of the polychromatic projection data,
for each of a plurality of power values within a range of power values,
correcting a line from the portion of the polychromatic projection data based on the power value,
calculating a Radon invariant for every rotation angle in the number of rotation angles,
calculating an average of the Radon invariants across all rotation angles in the number of rotation angles, and
calculating an error measure of a ratio between the Radon invariant for each rotation angle and the average Radon invariant, and
determining the optimal correction value based on the error measures calculated for all of the plurality of power values;
linearizing the polychromatic projection data according to the determined optimal correction value; and
reconstructing an image from the linearized projection data.

* * * * *